US008903361B2

(12) United States Patent
Weng

(10) Patent No.: US 8,903,361 B2
(45) Date of Patent: Dec. 2, 2014

(54) NETWORK LOCKING METHOD AND APPARATUS FOR TERMINAL

(71) Applicant: Huawei Device Co., Ltd., Shenzhen (CN)

(72) Inventor: Haiyin Weng, Xi'an (CN)

(73) Assignee: Huawei Device Co., Ltd., Shenzhen (CN)

( * ) Notice: Subject to any disclaimer, the term of this patent is extended or adjusted under 35 U.S.C. 154(b) by 36 days.

(21) Appl. No.: 13/687,941

(22) Filed: Nov. 28, 2012

(65) Prior Publication Data

US 2013/0090091 A1    Apr. 11, 2013

Related U.S. Application Data

(63) Continuation of application No. PCT/CN2011/084131, filed on Dec. 16, 2011.

(30) Foreign Application Priority Data

Dec. 20, 2010   (CN) .......................... 2010 1 0612315

(51) Int. Cl.
| | |
|---|---|
| H04M 3/16 | (2006.01) |
| H04W 12/06 | (2009.01) |
| H04W 12/12 | (2009.01) |
| G06F 21/57 | (2013.01) |
| H04W 8/18 | (2009.01) |

(52) U.S. Cl.
CPC .............. *H04W 12/06* (2013.01); *H04W 12/12* (2013.01); *G06F 21/57* (2013.01); *H04W 8/183* (2013.01)
USPC ........... 455/411; 455/410; 455/418; 455/558; 726/9

(58) Field of Classification Search
USPC ....................... 455/411, 410, 418, 558; 726/9
See application file for complete search history.

(56) References Cited

U.S. PATENT DOCUMENTS 7,929,959 B2 *   4/2011   De Atley et al. ............... 455/418
8,516,267 B2 *   8/2013   Spalka et al. .................. 713/189
(Continued)

FOREIGN PATENT DOCUMENTS

| CN | 101018125 A | * 8/2007 | ............. H04W 8/24 |
|---|---|---|---|
| CN | 101141731 A | 3/2008 | |

(Continued)

OTHER PUBLICATIONS

Extended European Search Report issued in corresponding European Patent Application No. 11852035.2, mailed Dec. 6, 2012.

(Continued)

*Primary Examiner* — Kashif Siddiqui
*Assistant Examiner* — Mong-Thuy Tran
(74) *Attorney, Agent, or Firm* — Brinks Gilson & Lione

(57) ABSTRACT

Embodiments of the present disclosure provide a network locking method and apparatus for a terminal. The method mainly includes: utilizing an IMSI number carried on a SIM card of the terminal to register the SIM card with a network, and obtaining a PLMN number of the network; comparing a PLMN number segment of the network with a valid PLMN number segment pre-stored on the terminal, and allowing or limiting, according to a comparison result, use of the SIM card by the terminal. According to the embodiments of the present disclosure, the SIM card is registered with the network by utilizing the IMSI number carried on the SIM card and a data card is verified in the terminal and network combined verification manner, which may ensure security of network locking for the terminal.

7 Claims, 3 Drawing Sheets

(56) References Cited

U.S. PATENT DOCUMENTS

| | | |
|---|---|---|
| 2006/0129848 A1* | 6/2006 | Paksoy et al. ............... 713/193 |
| 2006/0236111 A1* | 10/2006 | Bodensjo et al. ............ 713/176 |
| 2006/0251008 A1* | 11/2006 | Wu et al. ..................... 370/328 |
| 2006/0293036 A1* | 12/2006 | Zhou ............................. 455/415 |
| 2007/0129057 A1* | 6/2007 | Xu et al. ...................... 455/410 |
| 2007/0297367 A1* | 12/2007 | Wang et al. .................. 370/331 |
| 2008/0003980 A1* | 1/2008 | Voss et al. .................... 455/411 |
| 2008/0005577 A1* | 1/2008 | Rager et al. .................. 713/183 |
| 2008/0016557 A1* | 1/2008 | Yang ................................ 726/9 |
| 2010/0056102 A1* | 3/2010 | Chan et al. ................... 455/406 |
| 2010/0095364 A1 | 4/2010 | Norgaard et al. |
| 2011/0162082 A1* | 6/2011 | Paksoy et al. ................. 726/26 |
| 2011/0271101 A1 | 11/2011 | Liu |

FOREIGN PATENT DOCUMENTS

| | | |
|---|---|---|
| CN | 101291494 A | 10/2008 |
| CN | 101668286 A | 3/2010 |
| CN | 101742483 A | 6/2010 |
| CN | 102075910 A | 5/2011 |
| EP | 1146757 A1 | 10/2001 |
| EP | 1881670 A1 | 1/2008 |
| EP | 2134061 A2 | 12/2009 |
| WO | 2010/075644 A1 | 7/2010 |

OTHER PUBLICATIONS

LTE, "3$^{rd}$ Generation Partnership Project; Technical Specification Group Services and System Aspects; Personalisation of Mobile Equipment (ME); Mobile Functionality Specification" (Release 9) 3GPP TS 22.022. V9.1.0, Jun. 2010.

English Translation of International Search Report issued in corresponding PCT Application No. PCT/CN2011/084131; mailed Mar. 22, 2012.

First Office Action issued in corresponding Chinese Patent Application No. 201010612315.3 (including partial translation); mailed Aug. 31, 2012.

Office Action issued in corresponding Chinese Patent Application No. 201010612315.3, mailed Apr. 3, 2013.

* cited by examiner

NETWORK LOCKING METHOD AND APPARATUS FOR TERMINAL

CROSS-REFERENCE TO RELATED APPLICATIONS

This application is a continuation of International Application No. PCT/CN2011/084131, filed on Dec. 16, 2011, which claims priority to Chinese Patent Application No. 201010612315.3, filed on Dec. 20, 2010, both of which are hereby incorporated by reference in their entireties.

FIELD

The present disclosure relates to the field of communications technologies, and in particular, to a network locking method and apparatus for a terminal.

BACKGROUND

Generally, an operator protects its customer resources by locking a network, hoping its customers can only use network resources stipulated by the operator itself, therefore, the operator requires higher and higher security of network locking of a terminal product.

The operator generally implements a requirement on the network locking of a terminal by limiting the terminal to use of only a stipulated data card, such as a SIM (Subscriber Identity Module, subscriber identity module) card.

In the prior art, a network locking solution for the terminal mainly includes:

1. When producing a terminal, a manufacturer writes a valid public land mobile network (PLMN) number segment, a locking flag and an unlocking code value into a certain Flash (flash) in a board of the terminal.

2. When a terminal user inserts a SIM card into the board of the terminal, the board firstly reads a PLMN number in the SIM card after powered up, and compares the read PLMN number with the PLMN number segment written into the foregoing Flash. If the read PLMN number belongs to the PLMN number segment written into the foregoing Flash, the locking flag is removed, the terminal is unlocked, and the terminal uses the SIM card normally; otherwise, the user is prompted to input an unlocking code.

3. After receiving the unlocking code input by the user, the board calculates a Hash value through an MD5 algorithm and compares the Hash value with the foregoing unlocking code value written into the Flash. If the two are the same, the locking flag is removed, the terminal is unlocked, and the terminal uses the SIM card normally; otherwise, the terminal cannot use the SIM card and the terminal is continuously locked.

In a process of implementing the present disclosure, the inventor finds that the network locking solution in the prior art at least has the following problems.

The solution only verifies the SIM card on a terminal side, the checking method is simple, and it is quite easy for a hacker to cheat the SIM card verification by setting a fake PLMN in a manner of a card sticker and the like in addition to the original PLMN number carried on the SIM card.

The network locking solution unlocks the terminal through the unlocking code, which is also easy to be cracked by a hacker, and the security is low.

SUMMARY

Embodiments of the present disclosure provide a network locking method and apparatus for a terminal, so as to ensure security of network locking for the terminal.

A network locking method for a terminal includes: registering a subscriber identity module (SIM) card of the terminal with a network based on the SIM card, and obtaining a PLMN number of the network; and comparing the PLMN number of the network with a valid PLMN number segment pre-stored on the terminal, and allowing or limiting, according to a comparison result, use of the SIM card by the terminal.

A network locking apparatus for a terminal includes: a registration network public land mobile network PLMN number obtaining module, configured to register a SIM card of the terminal with a network based on an international mobile subscriber identity IMSI number carried on the SIM card, and obtain a PLMN number of the network; and a SIM card verification processing module, configured to compare a PLMN number segment of the network with a valid PLMN number segment pre-stored on the terminal, and allow or limit, according to a comparison result, use of the SIM card by the terminal.

According to the foregoing solutions provided in the embodiments of the present disclosure, it may be seen that, according to the embodiments of the present disclosure, the IMSI number carried on the SIM card of the terminal is utilized to register the SIM card with the network and the SIM card is verified in a terminal and network combined verification manner, which may avoid a situation that a hacker sets a fake PLMN in a manner of a card sticker and the like to cheat SIM card verification, and ensure security of network locking for the terminal.

BRIEF DESCRIPTION OF THE DRAWINGS

To illustrate the solutions in the embodiments of the present disclosure or in the prior art more clearly, the following briefly describes accompanying drawings needed for describing the embodiments or the prior art. Obviously, the accompanying drawings in the following description are merely some embodiments of the present disclosure, and persons of ordinary skill in the art may obtain other accompanying drawings from these accompanying drawings without making creative efforts.

DETAILED DESCRIPTION OF THE EMBODIMENTS

To make the objectives, solutions, and advantages of the present disclosure more clear and comprehensible, the following further describes the present disclosure in detail with reference to implementation manners and the accompanying drawings. Here the exemplary embodiments of the present disclosure and their description are merely used for explaining the present disclosure, but are not intended to limit the present disclosure.

For convenience of understanding the embodiments of the present disclosure, further explanation and illustration are given in the following with reference to the accompanying drawings and by using several specific embodiments as examples, and the embodiments are not intended to limit the embodiments of the present disclosure.

Embodiment 1

Figure 1:
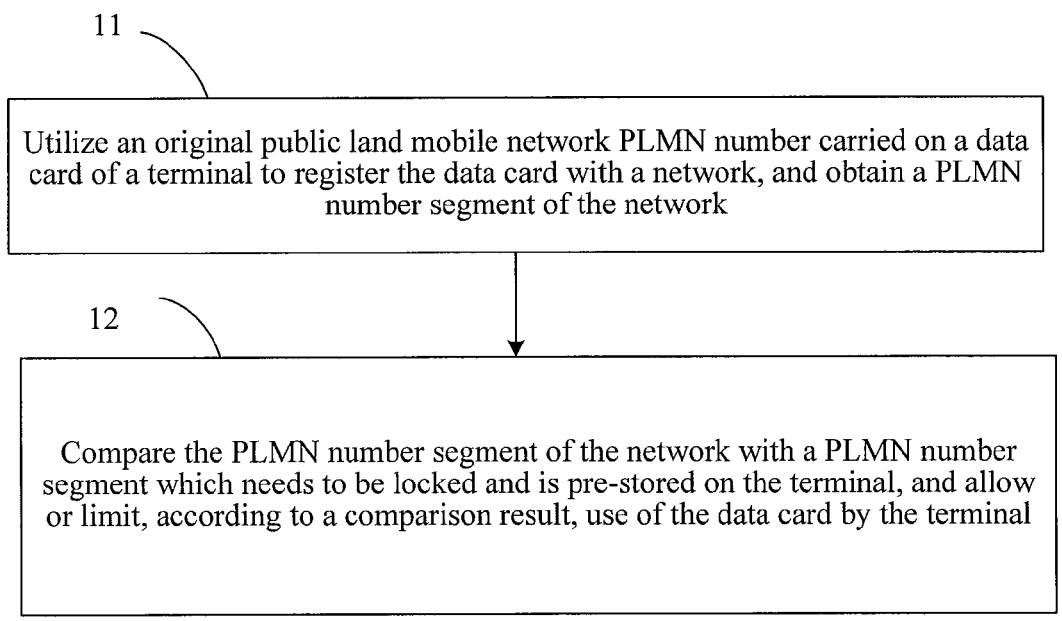
FIG. 1 is a specific processing flow chart of a network locking method for a terminal according to Embodiment 1 of the present disclosure.

A specific processing procedure of a network locking method for a terminal provided in the embodiment is as shown in FIG. 1 and includes the following processing steps.

Step 11: Utilize an IMSI (International Mobile Subscriber Identity, international mobile subscriber identity) number carried on a SIM card of a terminal to register the SIM card with a network and obtain a PLMN number of the network.

Step 12: Compare the PLMN number of the network with a valid PLMN number segment pre-stored on the terminal, and allow or limit, according to a comparison result, use of the data card by the terminal.

The PLMN number segment pre-stored on the foregoing terminal is formed of first few digits of an IMSI number of one or multiple SIM cards allowed to be used by the terminal, and the specific few digits may be preset and are referred to as first set digits of the IMSI number.

The PLMN number of the network is compared with the pre-stored valid PLMN number segment, and when the PLMN number of the registration network belongs to the stored valid PLMN number segment, it is determined that the SIM is valid, and the use of the SIM by the terminal is allowed.

When the PLMN number of the registration network does not belong to the stored valid PLMN number segment, if a state of registering the SIM with the network is normal, that is, a non-roaming state, it is determined that the SIM card is invalid, and the use of the SIM card by the terminal is limited; if the state of registering the SIM card with the network is roaming, the IMSI number is read from the SIM card, and the IMSI number is compared with the pre-stored valid PLMN number segment, so as to judge whether the first set digits of the IMSI number belong to the stored valid PLMN number segment; if yes, it is determined that the SIM card is valid, and the use of the SIM card by the terminal is allowed; otherwise, it is determined that the SIM card is invalid, and the use of the SIM card by the terminal is limited.

According to the embodiment, the SIM card is registered with the network by utilizing the IMSI number carried on the SIM card of the terminal, and the SIM card is verified in a terminal and network combined verification manner, which may avoid a situation that a hacker sets a fake PLMN in a manner of a card sticker and the like to cheat SIM card verification, and ensure security of network locking for the terminal.

Embodiment 2

Figure 2:
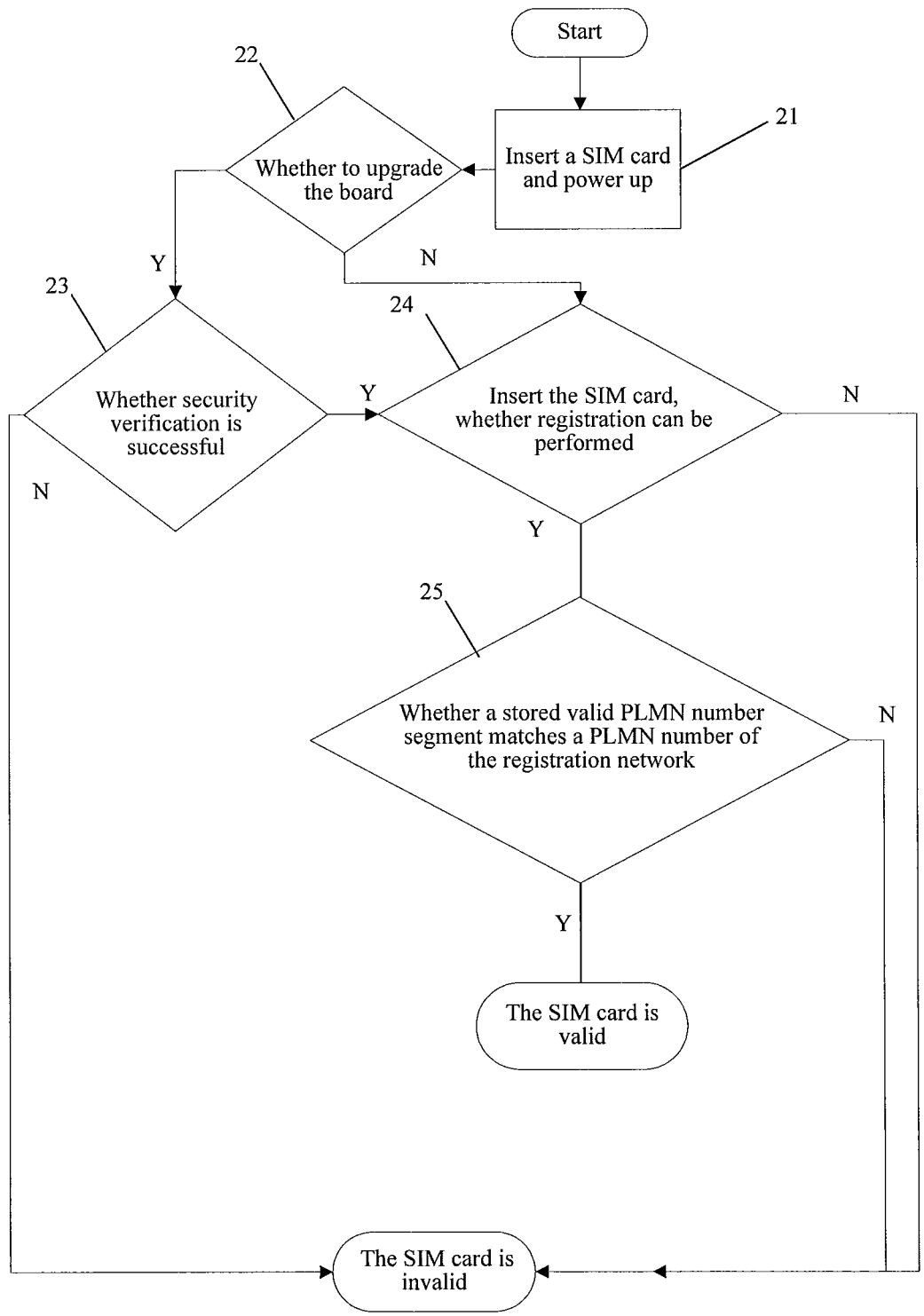
FIG. 2 is a specific processing flow chart of a network locking method for a terminal according to Embodiment 2 of the present disclosure.

A specific processing procedure of a network locking method for a terminal provided in the embodiment is as shown in FIG. 2, including the following processing steps.

When an operator produces the terminal, one or multiple SIM cards allowed to be used in the terminal are set according to a practical need, and a valid PLMN number segment is formed according to first set digits (such as first five or six digits) of an IMSI number of the one or multiple SIM cards allowed to be used.

The valid PLMN number segment is stored in a board inside the terminal through codes, and the foregoing PLMN number segment is written into a Flash on the board through the codes without using an NV (non volatile memory, Non Volatile Memory) item in a file system.

Optionally, in order to perform security verification, the operator calculates a total valid Hash (Hash) value according to multiple image files loaded on the board, separately calculates a valid Hash value according to every image file, presets a pair of public and private keys used for the security verification, and pre-stores all of the foregoing Hash values and the public and private keys on the terminal.

Step 21: A user inserts a to-be-used SIM card into a terminal and powers up the terminal.

Step 22: Judge whether to upgrade a board inside the terminal. For example, an operator upgrades the board according to a preset time interval. If yes, execute step 23; otherwise, execute step 24.

Step 23: A process of upgrading the board mainly includes: updating a source file of a memory, such as a Flash, in the board, and downloading the latest source file from a server into the board. The process of upgrading the board may be completed by the terminal alone. An objective of upgrading the board by the operator is to prevent the source file of the memory, such as the Flash, on the board from being tampered by a hacker.

In a practical application, the hacker may also make an upgrade package without authorization and upgrade the board without authorization, so as to achieve an objective of tampering the foregoing valid PLMN number segment. Therefore, after the process of upgrading the board is completed, security verification needs to be performed on the board.

A processing procedure of the security verification is as follows.

1. Calculate a Hash (Hash) value according to of multiple image files loaded on the board, and pack contents, such as the Hash value and the like, to form a digital certificate.

2. Sign the digital certificate through tool software by using a private key of a preset pair of public and private keys, and then pack and put the signed digital certificate into a boot image file of the board through one-click upgrade tool software.

3. Perform integrity verification on the digital certificate by using a public key of the foregoing preset pair of public and private keys, so as to obtain the Hash value in the digital certificate, and compare the Hash value with the pre-stored valid total Hash value. If the two are not consistent, it is determined that the board is insecure and a board self-destruction program is started, so that the board cannot be used normally. The board self-destruction program may lock up the board, or may make the board restart constantly. Definitely, if necessary, it may also trigger a hardware destruction function of the board.

Optionally, one Hash value is calculated for every image file loaded on the board, and contents, such as all the Hash values and the like, are packed to form the digital certificate. After the integrity verification is passed, the Hash value of every image file in the digital certificate is compared with the pre-stored Hash value of every image file, if a situation that the Hash value of any one of the image files does not match occurs, it is determined that the board is insecure and the board self-destruction program is started, so that the board cannot be used normally; after all the Hash values corresponding to the image files are matched, it is determined that the board is secure. Step 24 is executed.

Step 24: After SIM initialization is completed, utilize an IMSI number carried on the SIM card to register the SIM card with a corresponding network. If the SIM card fails to be registered with the network, the procedure ends.

After the SIM card is registered with the corresponding network, a PLMN number of the network is obtained. The foregoing stored valid PLMN number segment is compared with the obtained PLMN number of the registration network, and a validity verification result of the SIM card is determined according to a comparison result.

The PLMN number of the network is compared with the pre-stored valid PLMN number segment, when the PLMN number of the registration network belongs to the stored valid PLMN number segment, it is determined that the SIM is valid and use of the SIM by the terminal is allowed.

When the PLMN number of the registration network does not belong to the stored valid PLMN number segment, if a state of registering the SIM with the network is normal, that is, a non-roaming state, it is determined that the SIM card is invalid, and the use of the SIM card by the terminal is limited; if the state of registering the SIM card with the network is roaming, the IMSI number is read from the SIM card, first set digits of the IMSI number are compared with the pre-stored valid PLMN number segment, so as to judge whether the first set digits of the IMSI number belong to the stored valid PLMN number segment. If yes, it is determined that the SIM card is valid, and the use of the SIM card by the terminal is allowed; otherwise, it is determined that the SIM card is invalid, and the use of the SIM card by the terminal is limited.

Because the PLMN number of the registration network is unique and comes from the network, the terminal cannot change it. In the embodiment, by utilizing a terminal and network combined verification manner, a situation that the hacker sets a fake PLMN in a manner of a card sticker and the like to cheat the SIM card verification may be avoided, and security of network locking for the terminal may be ensured.

In the embodiment, after the process of upgrading the board is completed, by performing the security verification on the board, a situation that the hacker cracks, by modifying the codes in the board, the valid PLMN number segment stored in the board, may be prevented, and the security of the network locking may be further improved.

Figure 3:
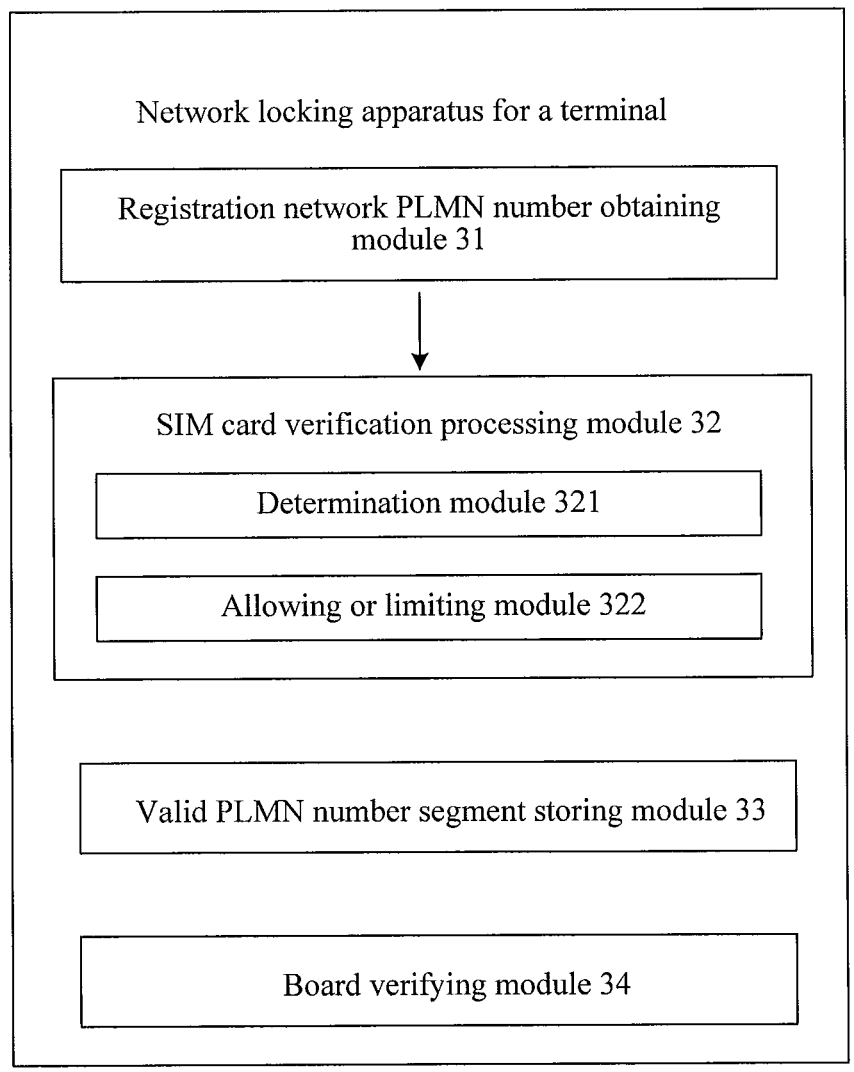
FIG. 3 is a specific structural diagram of a network locking apparatus for a terminal according to an embodiment of the present disclosure.

The embodiment further provides a network locking apparatus for a terminal, where its specific structure is as shown in FIG. 3, including the following modules:

a registration network PLMN number obtaining module 31, configured to utilize an international mobile subscriber identity IMSI number carried on a subscriber identity module SIM card of the terminal to register the SIM card with a network, and obtain a PLMN number of the network; and a SIM card verification processing module 32, configured to compare a PLMN number segment of the network with a valid PLMN number segment pre-stored on the terminal, and allow or limit, according to a comparison result, use of the SIM card by the terminal.

The apparatus may further include:

a valid PLMN number segment storing module 33, configured to form a valid PLMN number segment according to first set digits of an IMSI number of one or multiple SIM cards allowed to be used by the terminal, and store the valid PLMN number segment in a board inside the terminal through codes; and a board verifying module 34, configured to perform security verification on the board after upgrading of the board is completed, where the security verification includes: calculating a Hash value according to multiple image files loaded on the board and forming a digital certificate according to the Hash value; signing the digital certificate by using a private key of a preset pair of public and private keys and putting the signed digital certificate into a boot image file of the board; and performing integrity verification on the digital certificate by using a public key of the preset pair of public and private keys, obtaining the Hash value in the digital certificate and comparing the Hash value with a pre-stored valid Hash value; if the two are not consistent, determining that the board is insecure; otherwise, determining that the board is secure.

Optionally, one Hash value is calculated for every image file loaded on the board, and contents such as all the Hash values and the like are packed to form the digital certificate. After the integrity verification is passed, the Hash value of every image file in the digital certificate is compared with the pre-stored Hash value of every image file, and if a situation that the Hash value of any one of the image file does not match occurs, it is determined that the board is insecure and a board self-destruction program is started, so that the board cannot be used normally; after all the Hash values corresponding to the image files are matched, it is determined that the board is secure. The board self-destruction program may lock up the board, or may make the board restart constantly. Definitely, if necessary, it may also trigger a hardware destruction function of the board.

The SIM card verification processing module 32 may specifically include:

a determination module 321, configured to compare the PLMN number of the network with the pre-stored valid PLMN number segment, and judge whether the PLMN number of the network belongs to the stored valid PLMN number segment; and an allowing or limiting module 322, configured to, when a determination result of the determination module is yes, determine that the SIM card is valid and allow the use of the SIM card by the terminal; otherwise, according to a state of registering the SIM card with the network, allow or limit the use of the SIM card by the terminal.

The allowing or limiting module 322 is further configured to, if the state of registering the SIM card with the network is roaming, read the IMSI number from the SIM card, compare the first set digits of the IMSI number with the pre-stored valid PLMN number segment, and judge whether the first set digits of the IMSI number belong to the stored valid PLMN number segment. If yes, it is determined that the SIM card is valid, and the use of the SIM card by the terminal is allowed; otherwise, it is determined that the SIM card is invalid, and the use of the SIM card by the terminal is limited.

The terminal described in the embodiments of the present disclosure may be a data card or a mobile phone, or other wireless communication terminals which need to use a SIM card.

Persons of ordinary skill in the art may understand that all or part of the procedures of the methods in the embodiments may be implemented by a computer program instructing relevant hardware such as a hardware processor. The program may be stored in a computer readable storage medium accessible to the hardware processor. When the program is executed, the procedures of the methods in the embodiments are executed. The storage medium may be a magnetic disk, a compact disk, a read-only memory (ROM), or a random access memory (RAM), and so on.

In conclusion, according to the embodiments of the present disclosure, by utilizing the terminal and network combined verification manner, the situation that the hacker sets a fake PLMN in a manner of a card sticker and the like to cheat the SIM card verification may be avoided, and the security of network locking for the terminal may be secured.

After the process of upgrading the board is completed, by performing the security verification on the board, the situation that the hacker cracks, by modifying the codes in the board, the valid PLMN number segment stored in the board, may be prevented, and the security of the network locking may be further improved.

According to the embodiments of the present disclosure, a situation that the hacker unlocks the terminal by cracking an unlocking code may also be avoided.

The objectives, solutions, and benefits of the present disclosure are described in detail with reference to the foregoing specific implementation manners. It should be understood that the foregoing is merely specific implementation manners of the present disclosure, but is not intended to limit the protection scope of the present disclosure. Any modification, equivalent replacement, or improvement made without departing from the spirit and principle of the present disclosure shall fall within the protection scope of the present disclosure.

What is claimed is:

1. A network locking method for a terminal, comprising:
registering a subscriber identity module (SIM) card of the terminal with a network based on an international mobile subscriber identity (IMSI) number carried on the SIM card, obtaining a public land mobile network (PLMN) number of the network;
forming a valid PLMN number segment according to a first set digits of an IMSI number of at least one SIM card allowed to be used by the terminal, and storing the valid PLMN number segment on the terminal through codes;
obtaining the valid PLMN number segment pre-stored on the terminal by using the plurality of first digits of the IMSI number;
comparing the PLMN number of the network with the valid PLMN number segment pre-stored on the terminal and allowing or limiting, according to a comparison result, use of the SIM card by the terminal; and
performing security verification on the terminal after upgrading the terminal, wherein the security verification comprises: calculating one Hash value according to multiple image files loaded on the board and forming a digital certificate according to the Hash value; signing the digital certificate by using a private key of a preset pair of public and private keys and putting the signed digital certificate into a boot image file of the board; and performing integrity verification on the digital certificate by using a public key of the preset pair of public and private keys, obtaining the Hash value in the digital certificate and comparing the Hash value with a pre-stored valid Hash value, wherein if the two are not consistent, it is determined that the board is insecure; otherwise, it is determined that the board is secure.

2. The network locking method for the terminal according to claim 1, wherein the valid PLMN number segment is formed of first set digits of an IMSI number of one or multiple SIM cards allowed to be used by the terminal.

3. The network locking method for the terminal according to claim 1, wherein the comparing the PLMN number of the network with the pre-stored valid PLMN number segment and allowing or limiting, according to the comparison result, the use of the SIM card by the terminal comprises:
comparing the PLMN number of the network with the pre-stored valid PLMN number segment, wherein if the PLMN number of the network belongs to the stored valid PLMN number segment, it is determined that the SIM card is valid, and the use of the SIM card by the terminal is allowed; otherwise, the use of the SIM card by the terminal is allowed or limited according to a state of registering the SIM card with the network.

4. The network locking method for the terminal according to claim 3, wherein the allowing or limiting, according to the state of registering the SIM card with the network, the use of the SIM card by the terminal comprises:
if the state of registering the SIM card with the network is roaming, reading the IMSI number from the SIM card, comparing the first set digits of the IMSI number with the pre-stored valid PLMN number segment and determining whether the first set digits of the IMSI number belong to the stored valid PLMN number segment, wherein if yes, it is determined that the SIM card is valid and, the use of the SIM card by the terminal is allowed; otherwise, it is determined that the SIM card is invalid, and the use of the SIM card by the terminal is limited.

5. A network locking apparatus for a terminal, comprising:
a registration network public land mobile network (PLMN) number obtaining module implemented by a processor, configured to register a subscriber identity module (SIM) card of the terminal with a network based on an international mobile subscriber identity (IMSI) number carried on the SIM card, obtain a PLMN number of the network, and obtain a valid PLMN number segment pre-stored on the terminal by using the IMSI number; and
a SIM card verification processing module implemented by the processor, configured to compare a PLMN number segment of the network with the valid PLMN number segment pre-stored on the terminal, and allow or limit, according to a comparison result, use of the SIM card by the terminal;
a valid PLMN number segment storing module, configured to form the valid PLMN number segment according to first set digits of an IMSI number of at least one SIM cards allowed to be used by the terminal, and store the valid PLMN number segment on a board inside the terminal through codes; and
a board verifying module, configured to perform security verification on the board after upgrading of the board is completed, wherein the security verification comprises: calculating one Hash value according to multiple image files loaded on the board and forming a digital certificate according to the Hash value; signing the digital certificate by using a private key of a preset pair of public and private keys and putting the signed digital certificate into a boot image file of the board; and performing integrity verification on the digital certificate by using a public key of the preset pair of public and private keys, obtaining the Hash value in the digital certificate and comparing the Hash value with a pre-stored valid Hash value, wherein if the two are not consistent, it is determined that the board is insecure; otherwise, it is determined that the board is secure.

6. The network locking apparatus for the terminal according to claim 5, wherein the SIM card verification processing module comprises:
a determination module, configured to compare the PLMN number of the network with the pre-stored valid PLMN number segment, and judge whether the PLMN number of the network belongs to the stored valid PLMN number segment; and
an allowing or limiting module, configured to, when a determination result of the determination module is yes, determine that the SIM card is valid and allow the use of the SIM card by the terminal; otherwise, allow or limit, according to a state of registering the SIM card with the network, the use of the SIM card by the terminal.

7. The network locking apparatus for the terminal according to claim 6, wherein allowing or limiting module is further configured to, if the state of registering the SIM card with the network is roaming, read the IMSI number from the SIM card, compare the first set digits of the IMSI number with the pre-stored valid PLMN number segment and judge whether the first set digits of the IMSI number belong to the stored valid PLMN number segment, wherein if yes, it is determined that the SIM card is secure, and the use of the SIM card by the terminal is allowed; otherwise, it is determined that the SIM card is invalid, and the use of the SIM card by the terminal is limited.

* * * * *